United States Patent
Chang

(10) Patent No.: US 8,049,725 B2
(45) Date of Patent: Nov. 1, 2011

(54) WIRELESS MOUSE

(75) Inventor: A-Ming Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 588 days.

(21) Appl. No.: 12/210,528

(22) Filed: Sep. 15, 2008

(65) Prior Publication Data

US 2009/0244007 A1 Oct. 1, 2009

(30) Foreign Application Priority Data

Mar. 28, 2008 (TW) ................ 97111238 A

(51) Int. Cl.
*G06F 3/33* (2006.01)
(52) U.S. Cl. .......................................... 345/163
(58) Field of Classification Search .......... 345/156–166; 361/679.01; 16/221–392
See application file for complete search history.

(56) References Cited

U.S. PATENT DOCUMENTS

| | | | | |
|---|---|---|---|---|
| 4,424,606 A * | 1/1984 | Sorimachi | ........................ | 16/223 |
| 6,225,981 B1 * | 5/2001 | Lu | .................. | 345/164 |
| 6,411,281 B1 * | 6/2002 | Sasselli et al. | ................ | 345/163 |
| 6,775,836 B2 * | 8/2004 | Joung | ........................... | 720/639 |
| 7,068,495 B2 * | 6/2006 | Luo et al. | ................. | 361/679.56 |
| 7,104,588 B2 * | 9/2006 | George et al. | ............ | 296/146.12 |
| 7,119,793 B2 * | 10/2006 | Chen | ............................ | 345/166 |
| 7,136,046 B2 * | 11/2006 | Su | ................................ | 345/163 |
| 7,261,973 B2 * | 8/2007 | Tu et al. | ......................... | 429/100 |
| 2002/0158837 A1 * | 10/2002 | Hou | ........................... | 345/156 |
| 2005/0012718 A1 * | 1/2005 | Lin | ................................ | 345/163 |
| 2006/0109247 A1 * | 5/2006 | Chang | ........................... | 345/163 |

* cited by examiner

*Primary Examiner* — Ke Xiao
*Assistant Examiner* — Rodney Amadiz
(74) *Attorney, Agent, or Firm* — Kirton & McConkie; Evan R. Witt

(57) ABSTRACT

The present invention relates to a wireless mouse. The wireless mouse includes a base and a slidable battery cover. The slidable battery cover is pivotally coupled to the base. After the slidable battery cover is released from the base, the slidable battery cover is firstly slid outwardly and then rotated upwardly.

7 Claims, 4 Drawing Sheets

WIRELESS MOUSE

FIELD OF THE INVENTION

The present invention relates to a wireless mouse, and more particularly to a wireless mouse having a slidable battery cover.

BACKGROUND OF THE INVENTION

Nowadays, computer systems running in the Windows operation system environment are prevailing. For helping the user well operate the computer systems, the hardware and the software associated with the computer system are developed in views of humanization and user-friendliness. For example, a mouse becomes a popular human input device for the computer system. The mouse can be used as a cursor control device for moving the cursor shown on the computer screen. In addition, the user may press down the click buttons of the mouse to execute various instruction input operations. With increasing development of the wireless communication technologies, wireless mice have experienced great growth and are rapidly gaining in popularity especially for the users required to frequently carry the mice.

For most wireless mice, batteries are used as the main power source. Generally, the conventional wireless mouse has a battery receptacle for accommodating one or more batteries therein. After the power of the battery is exhausted, the battery receptacle should be exposed in order to replace the battery with a new one. Generally, a typical wireless mouse comprises a base and a foldable battery cover. The base is a main body of the wireless mouse. The battery receptacle and many elements for operating the wireless mouse are disposed within the base of the wireless mouse. The battery cover is pivotally coupled to the base with respect to a rotating shaft. When the battery cover is opened, the battery receptacle and the battery are exposed and thus the user may replace the battery with a new one.

For avoiding an apparent seam formed in the main body of the wireless mouse in views of aesthetics, the gap between the battery cover and the base should be as tiny as possible. Due to the tiny gap, the front edge of the battery cover is readily conflicted with the base when the battery cover is rotated upwardly or outwardly to be opened. The worse is that the rotating shaft is deviated or the battery cover is shifted.

SUMMARY OF THE INVENTION

It is an object of the present invention to provide a wireless mouse having a mechanism to facilitate the user to easily replace the battery. In particular, the wireless mouse of the present invention has a base and a slidable battery cover. After the slidable battery cover is released from the base, the slidable battery cover is firstly automatically slid outwardly and then automatically rotated upwardly so as to prevent from being conflicted with the base.

In accordance with an aspect of the present invention, there is provided a wireless mouse. The wireless mouse includes a base and a slidable battery cover. The slidable battery cover is pivotally coupled to the base. After the slidable battery cover is released from the base, the slidable battery cover is firstly slid outwardly and then rotated upwardly.

In an embodiment, the wireless mouse further includes a retractable hooking element and a recess. The retractable hooking element is disposed on the base and movable between a first position and a second position. The recess is disposed in an inner surface of the slidable battery cover. When the retractable hooking element is located in the first position, the retractable hooking element is engaged with the recess such that the slidable battery cover is closed. When the retractable hooking element is located in the second position, the retractable hooking element is disengaged from the recess such that the slidable battery cover is opened.

In an embodiment, the retractable hooking element comprises a button part and a hooking part. The button part is disposed in a bottom of the base. The hooking part is coupled to the button part. When the retractable hooking element is located in the first position, the button part is exposed to the bottom of the base and the button part is engaged with the recess. When the retractable hooking element is located in the second position, the button part is sunken within the base and disengaged from the recess.

In an embodiment, the wireless mouse further includes a compression spring, which is sustained against the button part and the base, for providing an elastic force to move the retractable hooking element from the second position to the first position.

In an embodiment, the wireless mouse further includes a sheath part, an insert stem and an extension spring. The sheath part is formed in the inner surface of the slidable battery cover. The insert stem is pivotally coupled to the base and inserted in the sheath part. The extension spring has an end fixed on the slidable battery cover and the other end fixed on the insert stem. An elastic force provided by the extension spring pushes outwardly the slidable battery cover after the slidable battery cover is released from the base.

In an embodiment, the wireless mouse further includes a torsion spring. The torsion spring has an end fixed on the base and the other end fixed on the insert stem. A torsion force provided by the torsion spring rotates the slidable battery cover upwardly after the slidable battery cover is released from the base.

In an embodiment, the wireless mouse further includes a guide slot and a guide slice. The guide slot is disposed within the base. The guide slice is disposed on the inner surface of the slidable battery cover. When the slidable battery cover is closed, the guide slice is in close contact with the guide slot. After the slidable battery cover is released from the base, the guide slice is confined by the guide slot such that the slidable battery cover is firstly slid outwardly and then the guide slice is detached from the guide slot such that the slidable battery cover is rotatable upwardly.

In an embodiment, the wireless mouse further includes a battery receptacle. The guide slot is defined by a top wall of the battery receptacle.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
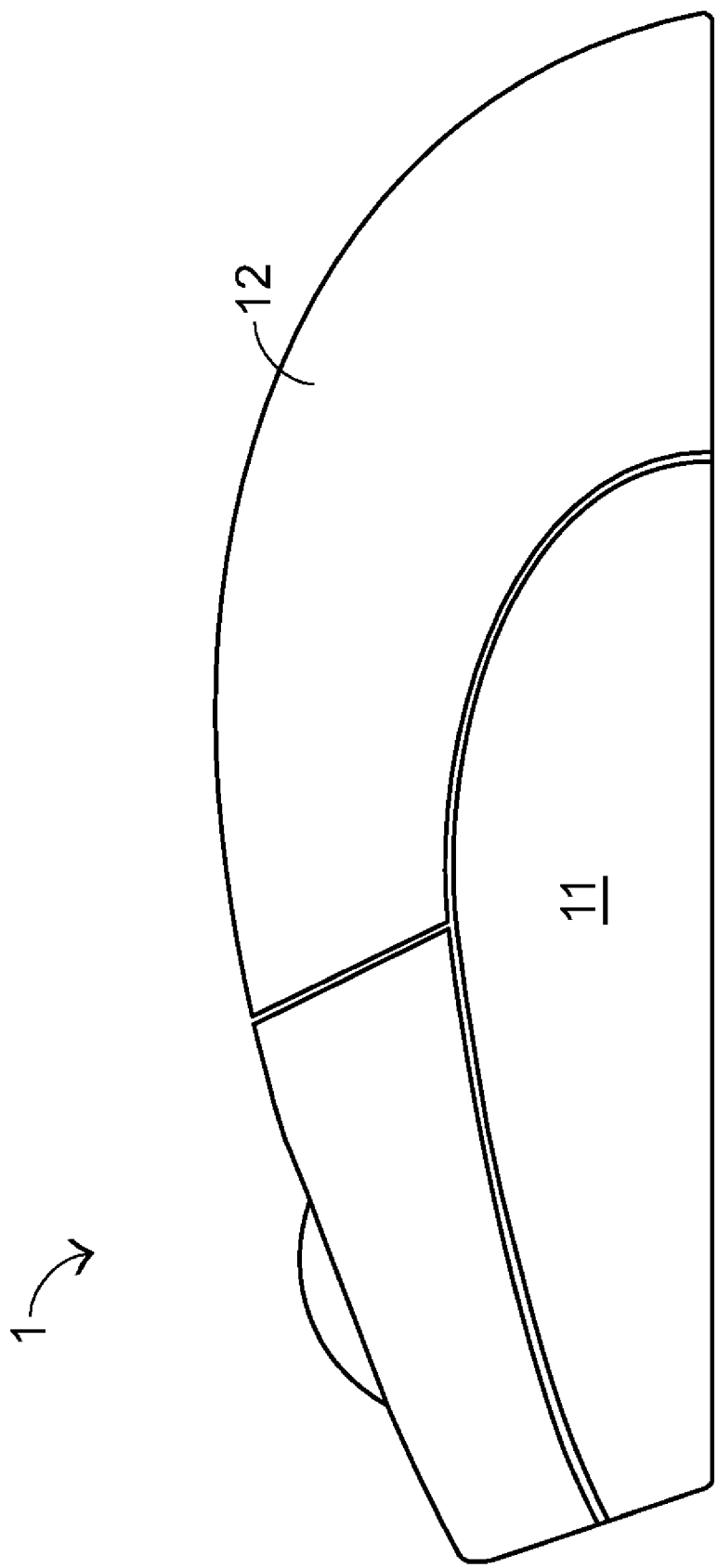
FIG. 1 is a schematic outward view of a wireless mouse according to a first preferred embodiment of the present invention.
Figure 4:
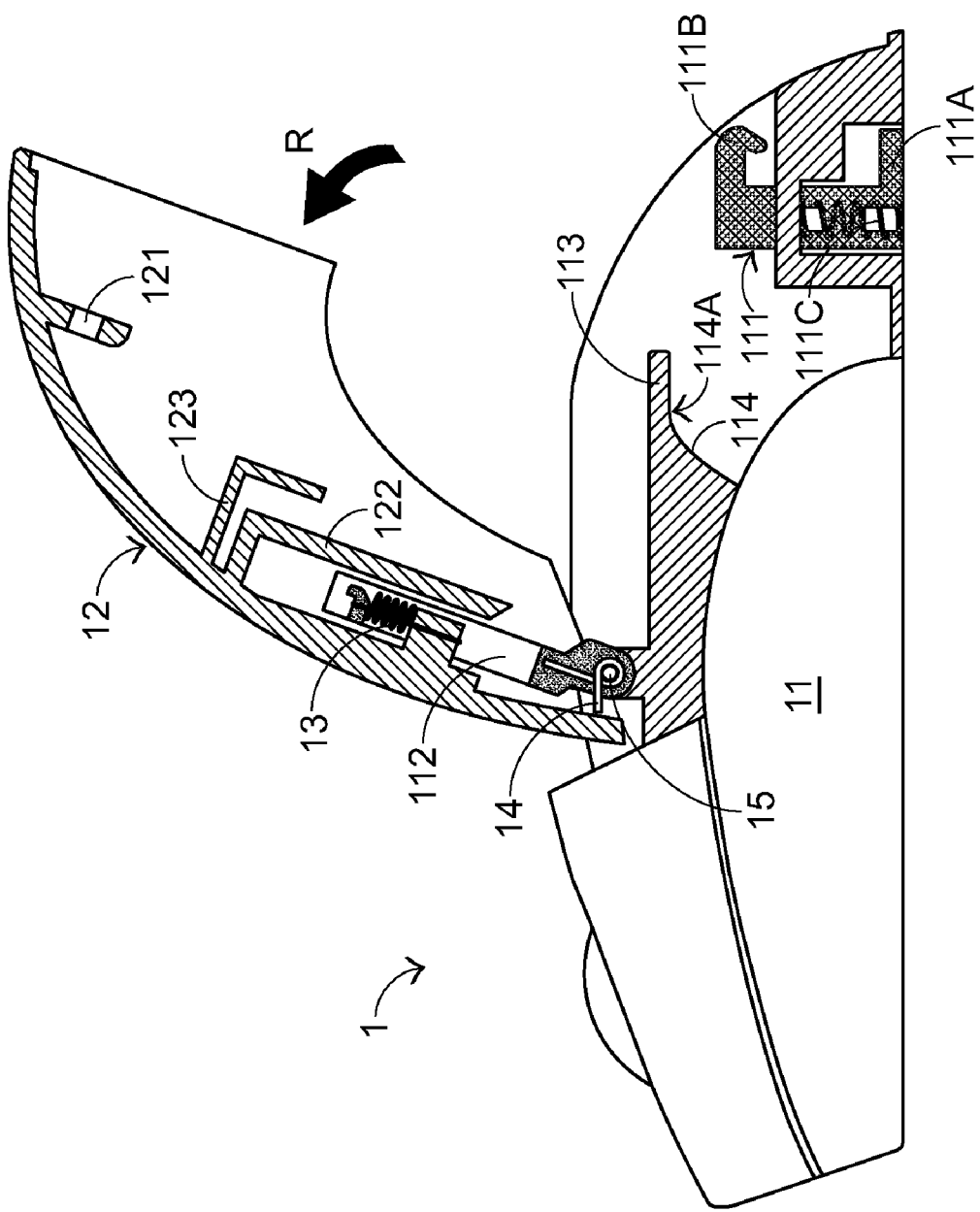
FIG. 4 is a schematic partial cross-sectional view illustrating the wireless mouse of the present invention, in which the slidable battery cover is released, slid outwardly and rotated upwardly.

FIG. 1 is a schematic outward view of a wireless mouse according to a first preferred embodiment of the present invention. As shown in FIG. 1, the wireless mouse 1 principally comprises a base II and a slidable battery cover 12. The base II is a main body of the wireless mouse 1. Various elements (not shown) for operating the wireless mouse 1 are accommodated within the base II of the wireless mouse 1. The slidable battery cover 12 is pivotally coupled to the base II. When the slidable battery cover 12 is opened, a battery receptacle (as shown in FIG. 4) is exposed and thus the user may replace the battery with a new one. In accordance with a key feature of the present invention, after the slidable battery cover 12 is released, the slidable battery cover 12 is firstly slid outwardly and then automatically rotated upwardly so as to prevent from being conflicted with the base 11.

Hereinafter, the mechanism of releasing the slidable battery cover 12 from the base II and the mechanism of firstly sliding outwardly and then rotating upwardly the slidable battery cover 12 after the slidable battery cover 12 is released will be illustrated in more details.

Figure 2:
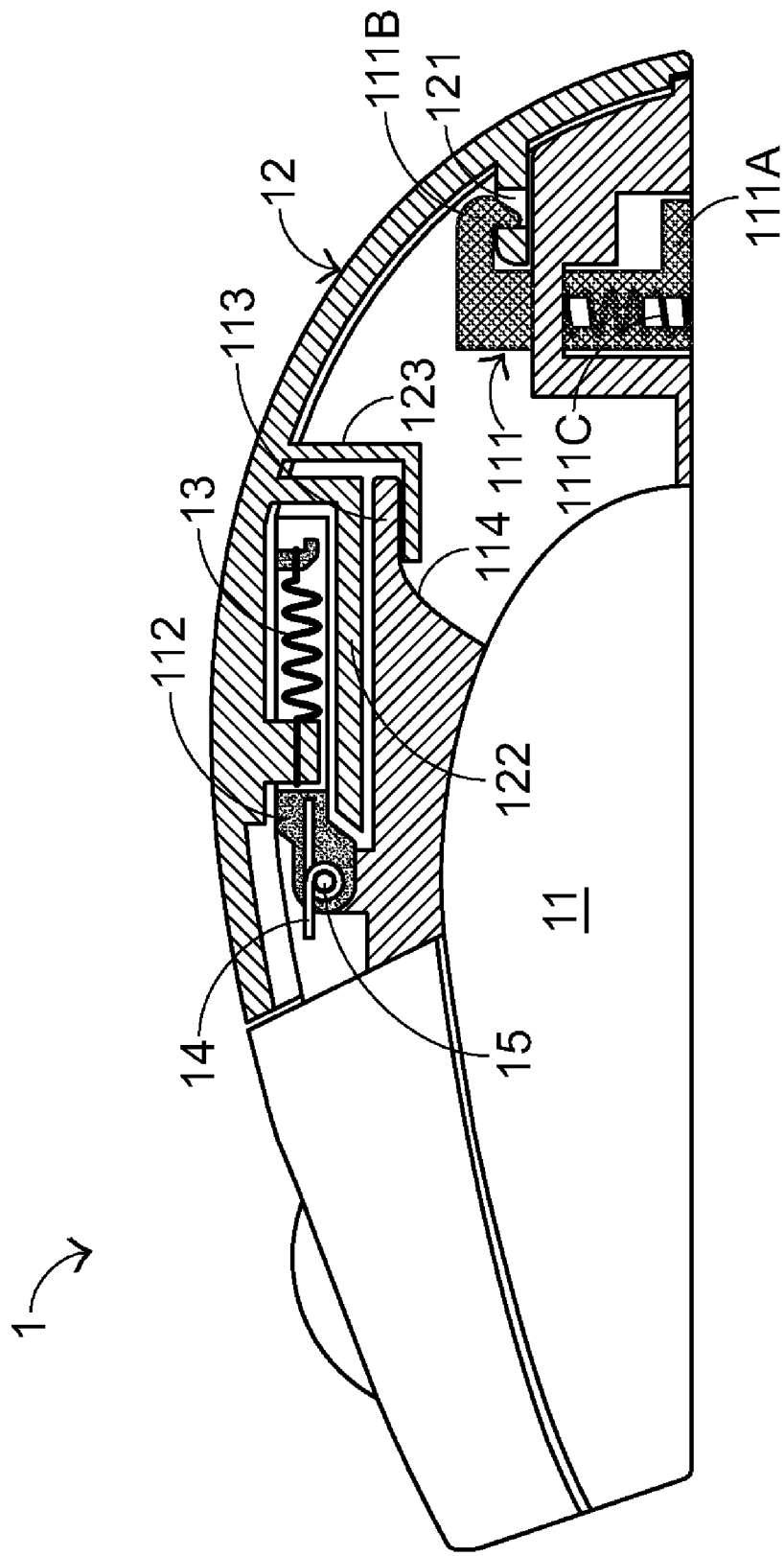
FIG. 2 is a schematic partial cross-sectional view illustrating the wireless of the present invention, in which the slidable battery cover is closed.

FIG. 2 is a schematic partial cross-sectional view of the wireless mouse 1, in which the slidable battery cover 12 is closed. With reference to FIG. 2, the mechanism of releasing the slidable battery cover 12 from the base 11 is illustrated. In this embodiment, a retractable hooking element 111 is disposed on the base II of the wireless mouse 1. Corresponding to the retractable hooking element 111, a recess 121 is disposed in the inner surface of the slidable battery cover 12. By engaging the retractable hooking element 111 with the recess 121, the slidable battery cover 12 is closed. On the contrary, by disengaging the retractable hooking element 111 from the recess 121, the slidable battery cover 12 is released from the base 11. The retractable hooking element 111 comprises a button part 111A, a hooking part 111B and a compression spring 111C. The button part 111A is disposed in the bottom of the base 11. In response to an external force exerted on the button part 111A, the button part 111A is pushed forwardly. The hooking part 111B is coupled to the button part 111A so that a transmission relationship is existed between the hooking part 111B and the button part 111A. The compression spring 111C is sustained against the button part 111A and the base 11. In response to a pushing force exerted on the button part 111A, the compression spring 111C is compressed so as to store elastic potential energy. When the external force is eliminated, the elastic potential energy is converted into kinetic energy to push back the button part 111A to its original position.

Figure 3:
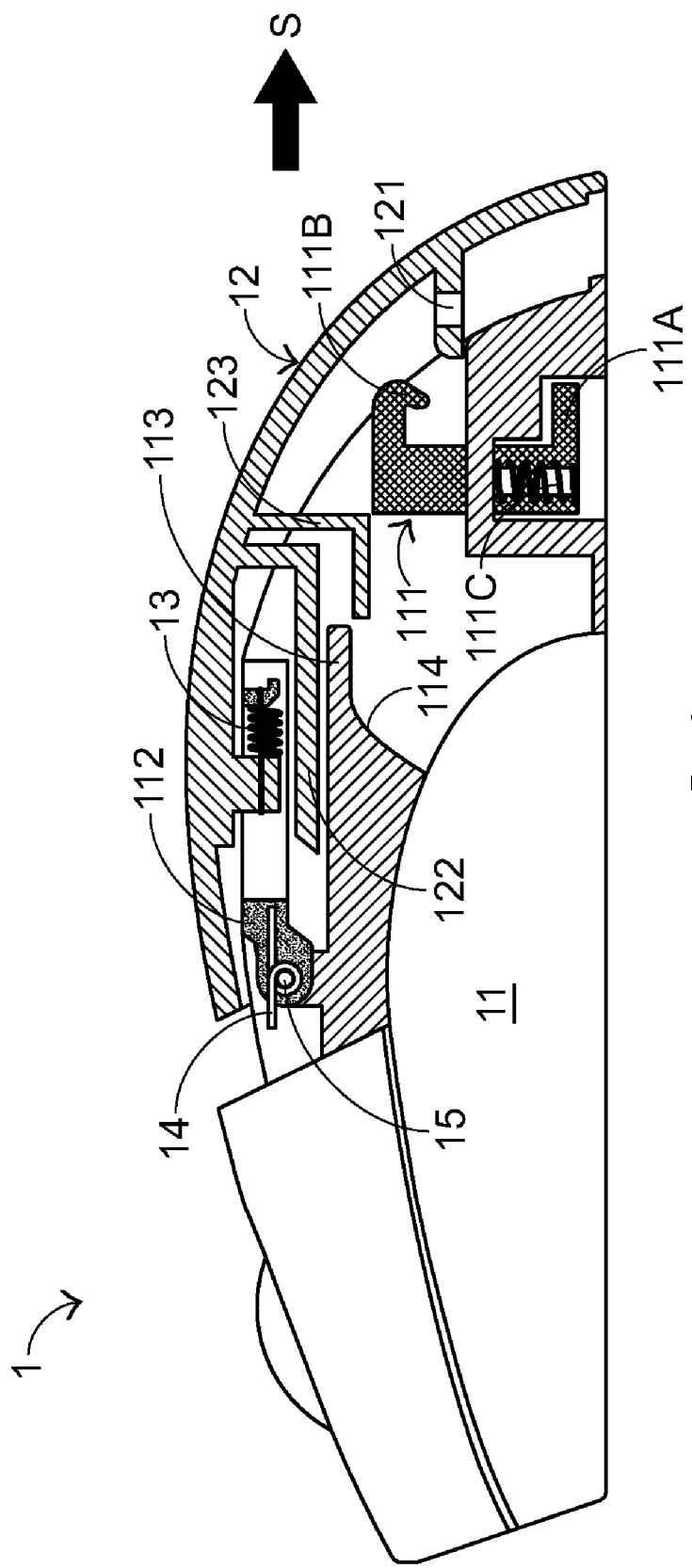
FIG. 3 is a schematic partial cross-sectional view illustrating the wireless of the present invention, in which the slidable battery cover is released and slid outwardly.

FIG. 3 is a schematic partial cross-sectional view of the wireless mouse 1, in which the slidable battery cover 12 is released and slid outwardly. Please refer to FIG. 2 and FIG. 3 in order to compare the wireless mouse 1 before the slidable battery cover 12 is released with the wireless mouse 1 after the slidable battery cover 12 is released. When the slidable battery cover 12 is closed (as is shown in FIG. 2), the retractable hooking element 111 is located in a first position, the button part 111A is exposed to the bottom of the base II and the hooking part 111B is engaged with the recess 121. In response to an external force (e.g. a pushing force by the user) exerted on the button part 111A, the button part 111A is sunken within the base 11 such that the retractable hooking element 111 is moved to a second position, as is shown in FIG. 3. Meanwhile, the hooking part 111B is disengaged from the recess 121 and thus the slidable battery cover 12 is released from the base 11.

Please refer to FIG. 2 and FIG. 3 again, which are schematic partial cross-sectional views of the wireless mouse 1 to illustrate how the slidable battery cover 12 is automatically slid outwardly after the slidable battery cover 12 is released from the base 11. In this embodiment, a sheath part 122 is formed in the inner surface of the slidable battery cover 12. Corresponding to the sheath part 122, an insert stem 112 (or an insert slice or an insert rod) is pivotally coupled to the base 11. The insert stem 112 can be inserted in the sheath part 122. As a consequence, the slidable battery cover 12 can be slid outward or inwardly in the direction parallel with the insert stem 112. Furthermore, an extension spring 13 is also disposed in the sheath part 122. The extension spring 13 has an end fixed on the slidable battery cover 12 and the other end fixed on the insert stem 112. When the slidable battery cover 12 is closed (as shown in FIG. 2), the extension spring 13 is stretched so as to store elastic potential energy. When the slidable battery cover 12 is released from the base 11 (as shown in FIG. 3), the elastic potential energy is converted into kinetic energy such that the slidable battery cover 12 is slid outwardly. Due to the extension spring 13 of the wireless mouse 1, the slidable battery cover 12 can be automatically slid outwardly after the slidable battery cover 12 is released from the base 11.

FIG. 4 is a schematic partial cross-sectional view of the wireless mouse 1, in which the slidable battery cover is released, slid outwardly and uplifted. Please refer to FIG. 2 and FIG. 4. The slidable battery cover 12 of the wireless mouse 1 is sheathed around the insert stem 112, which is pivotally coupled to the base 11. As a consequence, the slidable battery cover 12 can be slid along the insert stem 112. Moreover, as the insert stem 112 is rotated, the slidable battery cover 12 will be rotated. The wireless mouse 1 of the present invention has a torsion spring 14 for allowing the slidable battery cover 12 to be rotated upwardly after the slidable battery cover 12 is released from the base 11. The insert stem 112 is pivotally coupled to the base 11 via a rotating shaft 15. The torsion spring 14 is sheathed around the rotating shaft 15. The torsion spring 14 has an end fixed on the base 11 and the other end fixed on the insert stem 112. When the slidable battery cover 12 is closed (as shown in FIG. 2), the torsion spring 14 is twisted so as to store elastic potential energy. When the slidable battery cover 12 is released from the base 11 (as shown in FIG. 4), the elastic potential energy is converted into kinetic energy such that the slidable battery cover 12 is rotated upwardly. Due to the torsion spring 14 of the wireless mouse 1, the slidable battery cover 12 can be automatically rotated upwardly after the slidable battery cover 12 is released from the base 11.

For preventing the front edge of the slidable battery cover 12 from being conflicted with the base 11 during the slidable battery cover 12 is rotated upwardly, the wireless mouse 1 of the present invention has a specified design such that the slidable battery cover 12 is slid outwardly for a certain distance and then rotated upwardly after the slidable battery cover 12 is released from the base 11. The mechanism of sliding outwardly and then rotating upwardly the slidable battery cover 12 after the slidable battery cover 12 is released from the base 11 will be illustrated with reference to FIG. 2, FIG. 3 and FIG. 4. In this embodiment, a guide slice 123 is further arranged on the inner surface of the slidable battery cover 12. Corresponding to the guide slice 123, a guide slot 113 is disposed within the base 11. When the slidable battery cover 12 is closed (as shown in FIG. 2), the guide slice 123 is in close contact with or in the vicinity of the guide slot 113 such that the guide slice 123 is confined by the guide slot 113. When the slidable battery cover 12 is released from the base 11, the elastic force provided by the extension spring 13 will slide outwardly the slidable battery cover 12 in the arrow direction S for a certain distance until the guide slice 123 is detached from the guide slot 113 (as shown in FIG. 3). Since the guide slice 123 is no longer confined by the guide slot 113 at this moment, the slidable battery cover 12 will be rotated upwardly in the arrow direction R (as shown in FIG. 4). Accordingly, the mechanism of sliding outwardly and then rotating upwardly the slidable battery cover 12 after the slidable battery cover 12 is released from the base 11 can prevent the front edge of the slidable battery cover 12 from being conflicted with the base 11. In addition to the guide slot 113 disposed within the base 11, the top wall 114A of the battery receptacle 114 can be defined as an alternative guide slot.

For replacing the battery, the user may press down the button part 111A in the bottom of the base 11 to release the slidable battery cover 12 from the base 11. Subsequently, the slidable battery cover 12 is slid outwardly and then rotated upwardly to expose the battery receptacle 114 within the base 11. When the battery receptacle 114 is exposed, the user may replace the battery with difficulty. After a new battery is accommodated within the battery receptacle 114, the user may rotate downwardly the slidable battery cover 12 and then push the slidable battery cover 12 inwardly so as to close the slidable battery cover 12.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless mouse comprising:
    a base;
    a slidable battery cover pivotally coupled to said base, wherein said slidable battery cover is firstly slid outwardly and then rotated upwardly after said slidable battery cover is released from said base;
    a sheath part formed in said inner surface of said slidable battery cover;
    an insert stem pivotally coupled to said base and inserted in said sheath part; and
    an extension spring having an end fixed on said slidable battery cover and the other end fixed on said insert stem, wherein an elastic force provided by said extension spring pushes outwardly said slidable battery cover after said slidable battery cover is released from said base.

2. The wireless mouse according to claim 1 further comprising:
    a retractable hooking element disposed on said base and movable between a first position and a second position; and
    a recess disposed in an inner surface of said slidable battery cover, wherein when said retractable hooking element is located in said first position, said retractable hooking element is engaged with said recess such that said slidable battery cover is closed, and when said retractable hooking element is located in said second position, said retractable hooking element is disengaged from said recess such that said slidable battery cover is opened.

3. The wireless mouse according to claim 2 wherein said retractable hooking element comprises:
    a button part disposed in a bottom of said base; and
    a hooking part coupled to said button part, wherein said button part is exposed to said bottom of said base and said button part is engaged with said recess when said retractable hooking element is located in said first position, and said button part is sunken within said base and disengaged from said recess when said retractable hooking element is located in said second position.

4. The wireless mouse according to claim 3 further comprising a compression spring, which is sustained against said button part and said base, for providing an elastic force to move said retractable hooking element from said second position to said first position.

5. The wireless mouse according to claim 1 further comprising a torsion spring having an end fixed on said base and the other end fixed on said insert stem, wherein a torsion force provided by said torsion spring rotates said slidable battery cover upwardly after said slidable battery cover is released from said base.

6. The wireless mouse according to claim 5 further comprising:
    a guide slot disposed within said base; and
    a guide slice disposed on said inner surface of said slidable battery cover, wherein when said slidable battery cover is closed, said guide slice is in close contact with said guide slot, and after said slidable battery cover is released from said base, said guide slice is confined by said guide slot such that said slidable battery cover is firstly slid outwardly and then said guide slice is detached from said guide slot such that said slidable battery cover is rotatable upwardly.

7. The wireless mouse according to claim 6 further comprising a battery receptacle, wherein said guide slot is defined by a top wall of said battery receptacle.

* * * * *